No. 790,857. PATENTED MAY 23, 1905.
J. TAAFFE & L. F. WINTERS.
COMB.
APPLICATION FILED AUG. 17, 1904.
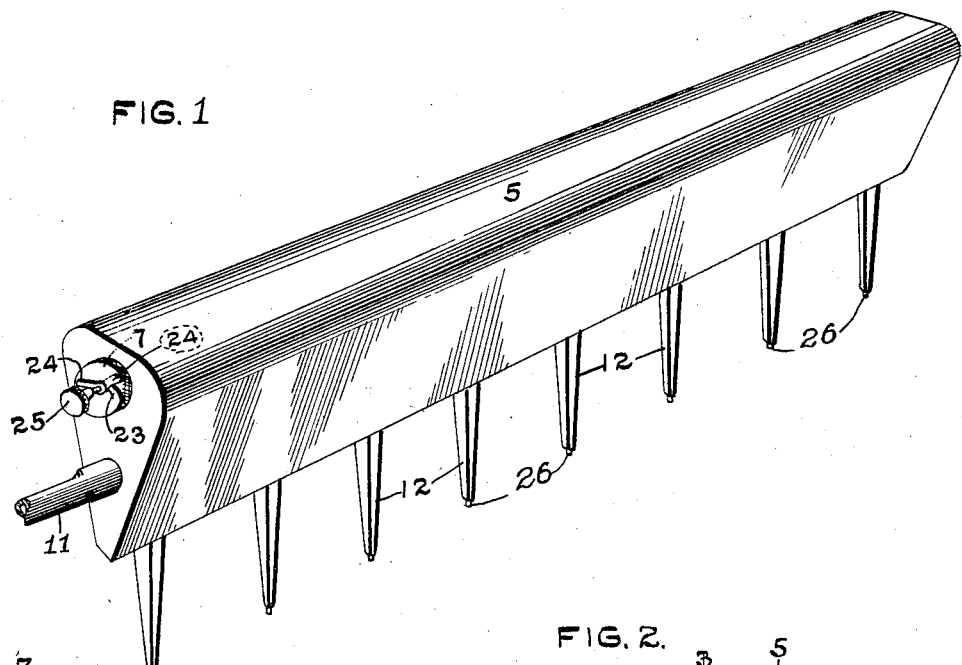
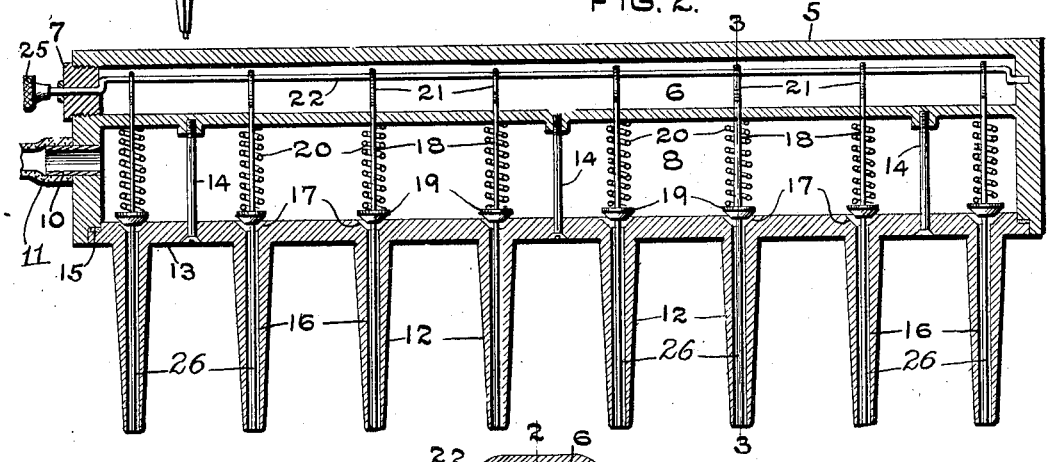
ATTEST
A. J. McCauley
Alfred Ewis
INVENTORS:-
James Taaffe
Lewis F. Winters
BY Higdon & Longan & Hopkins,
ATTYS.

No. 790,857. Patented May 23, 1905.

UNITED STATES PATENT OFFICE.

JAMES TAAFFE, OF EAST ST. LOUIS, ILLINOIS, AND LEWIS F. WINTERS, OF ST. LOUIS, MISSOURI.

COMB.

SPECIFICATION forming part of Letters Patent No. 790,857, dated May 23, 1905.

Application filed August 17, 1904. Serial No. 221,154.

*To all whom it may concern:*

Be it known that we, JAMES TAAFFE, a resident of East St. Louis, Illinois, and LEWIS F. WINTERS, a resident of St. Louis, Missouri, citizens of the United States, have invented certain new and useful Improvements in Combs, of which the following is a specification, containing a full, clear, and exact description, reference being had to the accompanying drawings, forming a part hereof.

Our invention relates to improvements in combs; and it consists of the novel features herein shown, described, and claimed.

In the drawings, Figure 1 is a perspective, upon an enlarged scale, of a comb embodying the principles of our invention. Fig. 2 is a vertical central longitudinal section upon the line 2 2 of Fig. 3. Fig. 3 is a cross-section taken approximately upon the line 3 3 of Fig. 2.

Referring to the drawings in detail, the back or frame 5 of the comb has a longitudinal bore 6, forming a chamber closed at one end by a solid wall and closed at the other end by a removable plug 7, and has a second chamber 8 below the chamber 6 and communicating therewith by bearing-openings 9. A nipple 10 forms a passage through one end wall of the chamber 8, and a rubber hose 11 is connected to the nipple and to any suitable source of liquid-supply.

The comb-teeth 12 are formed integral with an attaching-plate 13, and the plate 13 is fitted in the back 5 to close the lower end of the chamber 8 and held in position by screws 14. A packing-ring 15 assists in forming a tight joint between the plate 13 and the back 5. Each one of the teeth has a liquid-passage 16 leading from the chamber 8 to the point of the teeth, there being a valve-seat 17 at the upper end of the passage. The valve-stems 18 have valves 19 rigidly mounted upon their lower ends, said valves being in position to rest in the seats 17, and expansive coil-springs 20 are inserted around the valve-stems 18 between the valves 19 and the wall at the upper side of the chamber 8, the tension of said springs being exerted to hold the valves yieldingly upon their seats. The upper ends of the valve-stems 18 operate through the openings 9, and crank-shaft bearing-rings 21 are formed upon the upper ends of the valve-stems within the chamber 6.

A crank-shaft 22 is mounted in the chamber 6, one end of the shaft being journaled in the wall at the solid end of the chamber and the other end of the shaft being journaled in the plug 7, said shaft operating through the crank-shaft bearing-rings 21. A stop 23 is formed upon the outer face of the plug 7, and a stop-arm 24 is fixed upon the shaft 22 in position to engage the stop 23. A kerned head 25 is fixed upon the outer end of the shaft 22 for rotating the shaft back and forth, so that when the stop-arm 24 is in contact with the stop 23 the central part of the shaft 22 will be above the center and the valves 19 will be off their seats, so as to allow the liquid to pass from the chamber 8 through the teeth, and so that when the stop-arm 24 is rotated away from the stop 23 the central portion of the shaft will be below the center and the valves 19 will be upon their seats, so as to stop the flow of liquid from the chamber 8. The valve-operating fingers 26 extend from the valves 19 through the passages 16 in the teeth, such fingers being of such length that when the valves 19 are upon their seats the fingers project a slight distance beyond the ends of the teeth.

In the operation of our improved comb the valves are normally upon their seats, a suitable hair tonic or dressing for the treatment of the scalp or hair is placed in the receptacle and connected to the comb by the hose 11, and the comb is passed through the hair. The projecting ends of the fingers 26 will contact with the scalp, raise the corresponding valve, and allow the tonic to be expelled and discharged upon the scalp, and as soon as the pressure against the scalp ceases the valve will close and stop the flow. When it is desired to wash the hair or head, the head 25 is operated to unseat the valves and allow the liquid to flow freely through all the teeth.

We claim—

1. In a comb: a suitable back having a liquid-chamber; teeth extending from the back and having passages leading from the chamber; valves for controlling the passages; and means of unseating the valves and holding them unseated; substantially as specified.

2. In a comb: a suitable back having a liquid-chamber; teeth extending from the back and having passages leading from the chamber; valves for controlling the passages; means of unseating the valves and holding them unseated; and fingers extending from the valves in position to engage the scalp and unseat the valves; substantially as specified.

In testimony whereof we have signed our names to this specification in presence of two subscribing witnesses.

JAMES TAAFFE.
LEWIS F. WINTERS.

Witnesses:
ALFRED A. EICKS,
F. C. CRISLER.